United States Patent

[11] 3,590,156

[72] Inventor Richard A. Easton
West Lafayette, Ind.
[21] Appl. No. 755,961
[22] Filed Aug. 28, 1968
[45] Patented June 29, 1971
[73] Assignee Zenith Radio Corporation
Chicago, Ill.

[54] FLAT PANEL DISPLAY SYSTEM WITH TIME-MODULATED GRAY SCALE
10 Claims, 7 Drawing Figs.

[52] U.S. Cl. .......... 178/7.5 D, 313/108 B, 315/169 TV
[51] Int. Cl. .......... H04n 3/10
[50] Field of Search .......... 178/7.3 D, 7.5 D, 6 A, 6 LM; 315/169 TV; 313/108

[56] References Cited
UNITED STATES PATENTS 3,021,387 2/1962 Rajchman .......... 178/5.4 (EL)
3,263,028 7/1966 Shanafelt et al. .......... 178/7.3 (D)
3,293,356 12/1966 Aiken .......... 178/5.4 (EL)

*Primary Examiner*—Robert L. Griffin
*Assistant Examiner*—Richard P. Lange
*Attorney*—John J. Pederson

ABSTRACT: A picture display system using a flat panel image display device and a separate memory system for generating quantized video signals to control the display panel. A switching system is provided for synchronously addressing both the display panel and the separate memory system to control the duty factor of each display element in accordance with the received picture signals. Two embodiments are shown, one in which separate binary element memory matrices are provided for each intermediate level in the gray scale, and the other in which a single multiple-level memory matrix is employed, with repetitive interrogation at different amplitudes to develop the quantized signals for the respective intermediate gray levels. The number of memory elements may be substantially smaller than the number of display elements.

Inventor
Richard A. Easton
By [signature]
Attorney

FLAT PANEL DISPLAY SYSTEM WITH TIME-MODULATED GRAY SCALE

BACKGROUND OF THE INVENTION

This invention relates to a picture display systems and more particularly to such systems employing flat panel image display devices.

Various types of flat panel image display devices have been devised and are discussed in the technical literature. For example, numerous constructions are based on the use of electroluminescent phosphor materials which respond to an applied current or voltage to generate light output. Recombination or injection luminescent diodes may also be used as light sources in flat panel displays. In such a configuration, the display element at each image point is a separate and independently energizable light source, and means must be devised for not only systematically addressing the multitudinous display elements but also for controlling the applied current to provide the necessary brightness variations for halftone image reproduction. Another type of known flat panel image display device involves the provision of picture control elements operating as shutters or light valves, either in a transmission or a reflection mode, to develop a halftone image from an external light source; in essence, a single light source may be employed but the individual display elements have to be systematically addressed and again there must be some provision for modulating the image brightness at the respective image points. In general, gray scale modulation has again been achieved by modulating the actuating currents or voltages for the individual display elements, in a manner analogous to the intensity modulation of the scanning electron beam in a cathode-ray tube display system. The necessity for intensity modulation of voltage or current leads to undesirable complexity in the structural requirements of the individual display elements and/or of the addressing system for providing individual access to such elements.

It is an important object of the present invention to provide a new and improved picture display system of the type comprising a flat panel image display device, in which one or more of the disadvantages of prior art devices and systems are substantially overcome.

It is a more particular object of the invention to provide a new and improved picture display system of the type comprising a flat panel image display device, which provides substantially improved image brightness and contrast as compared with prior systems.

Yet another object of the invention is to provide a new and improved picture display system of the type comprising a flat panel image display device, which is capable of providing halftone image reproduction with greater brightness and clarity than that achievable in present day television apparatus of the type employing a cathode-ray tube as its image display device.

In a television display system of the type employing a cathode-ray tube as the image display device, each phosphor element is energized for only so long a period of time as the scanning electron beam dwells at the image point, and consequently only low duty cycle light generation is attained. Gray scale modulation is conventionally achieved by modulating the cathode ray beam current in accordance with the received video signal.

Most flat panel display devices are also of the type requiring amplitude control of voltage or current at each individual image point. In addition to the undesirable structural complexity of the individual display elements and the difficulties encountered in systematically addressing the display elements with brightness- related signal information, flat panel display devices of this type are operated with extremely short duty cycles and are therefore severely brightness limited. To improve the brightness of such devices, it has been suggested to associate individual storage capacitors or other storage elements with each of the multitudinous display elements, and to thus prolong the actuation of all display elements associated with illuminated picture points. This of course introduces further undesirable structural complexity, and any brightness gain is achieved at the expense of contrast degradation.

There are other types of flat panel displays, largely used in alphanumeric display systems, in which the individual display elements are of the binary or bistable type, i.e., are operated on a simple on-off basis. While these have the advantage of relative structural simplicity, such systems contain no provision for gray scale rendition and are therefore not generally adaptable to television-type display systems.

A further object of the present invention is to provide a new and improved picture display system, capable of providing halftone image reproduction, in which the individual display elements are of the bistable type, being either on or off at all times, thus providing a substantial structural simplification as compared with prior systems requiring modulation of the actuating currents or voltages for the individual elements.

There have been proposals to provide gray scale brightness variations in flat panel display devices by introducing time or duty cycle modulation to obtain intermediate brightness levels, but such proposals have provided for storage of brightness information for time intervals no longer than a single line-scanning interval, thus providing only a moderate improvement in duty cycle and yielding still inadequate image brightness. In systems embodying the present invention, the duty factor for the individual display elements may be the ratio of many line durations to the frame duration.

The present invention is useful with many different types of flat panel image display devices, including, for example, gas discharge light sources, electroluminescent element display devices, injection luminescent display devices, or matrices of magnetically or electrically controllable light valves. It is required that each display element be bistable, that is, that a single control signal, such as a pulse or train of pulses, turns the element on and it stays on until another control signal, which may be a pulse or train of pulses, turns the element off. During the time when the element is on, it may receive power to maintain it on from a source of "sustaining" power, although other types of display elements, such as light valves, which do not require a source of sustaining power to maintain themselves in either the on or the off condition, may also be employed.

In accordance with the invention, brightness and contrast limitations of prior systems are overcome while producing a multiple-level gray scale with two-level picture elements by providing a memory device which is separate from the matrix-type display device. Maximum black level is obtained by not actuating a display element at all, while maximum white level is obtained by actuating it for a fixed length of time equal to a predetermined number of scanning line intervals. Intermediate brightness levels are achieved by actuating display elements for smaller multiples of a line-scanning interval. Preferably, the spacings between the selected discrete intermediate brightness levels are chosen to correspond to a square-law distribution to compensate for the exponential nature of the brightness response characteristic of the human eye, but other distributions of brightness levels may also be used to advantage. In practice, it has been found that a whole range of halftone brightness variations equal to or better than that obtainable with present day cathode-ray tube television broadcast receiver displays can be obtained by employing only six intermediate brightness levels between maximum black and maximum white levels, with the preferred square-law spacings between adjacent brightness levels. With this system, the actuation times for the different brightness levels correspond to zero, one, two, four, eight, 16, 32, and 64 scanning line intervals respectively, progressing from maximum black to maximum white level. At maximum white level, then, the duty factor of an individual display element is approximately one-eighth, since 64 scanning lines is approximately one-eighth of a 525-line standard scanning raster. Such operation provides an average brightness improvement by a factor of approximately 30,000 times as compared with the same type of display panel having no storage for each of the display elements, and a factor of approximately 60 times as compared with the prior art time-modulated display systems, in which the storage time is limited to a maximum of one scanning line in duration.

Moreover, in addition to the greatly improved average brightness obtainable by the use of the invention, a very substantial saving in the amount of required memory or storage apparatus is also attained. Since only the intermediate brightness levels require information storage, a storage matrix of only 33 lines of analog memory elements or six matrices totaling 69 lines of binary storage elements can accommodate eight levels of square-law-spaced brightness modulation; this constitutes only approximately one-sixteenth of the storage apparatus required in prior systems employing an individual storage element for each image point. This equipment saving is offset in part by the necessity of providing appropriate switching equipment to relate the storage matrix to the display panel in such a way as to provide proper correlation between the scanning of the storage and display matrices, but with the use of integrated circuit techniques, construction of the image display panel, the external memory system, and all of the necessary switching apparatus in a compact flat panel assembly of a type suitable for wall mounting, for example, is entirely feasible.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several FIGS. of which like reference numerals identify like elements, and in which:

DESCRIPTION OF THE PREFERRED EMBODIMENTS

Figure 1:
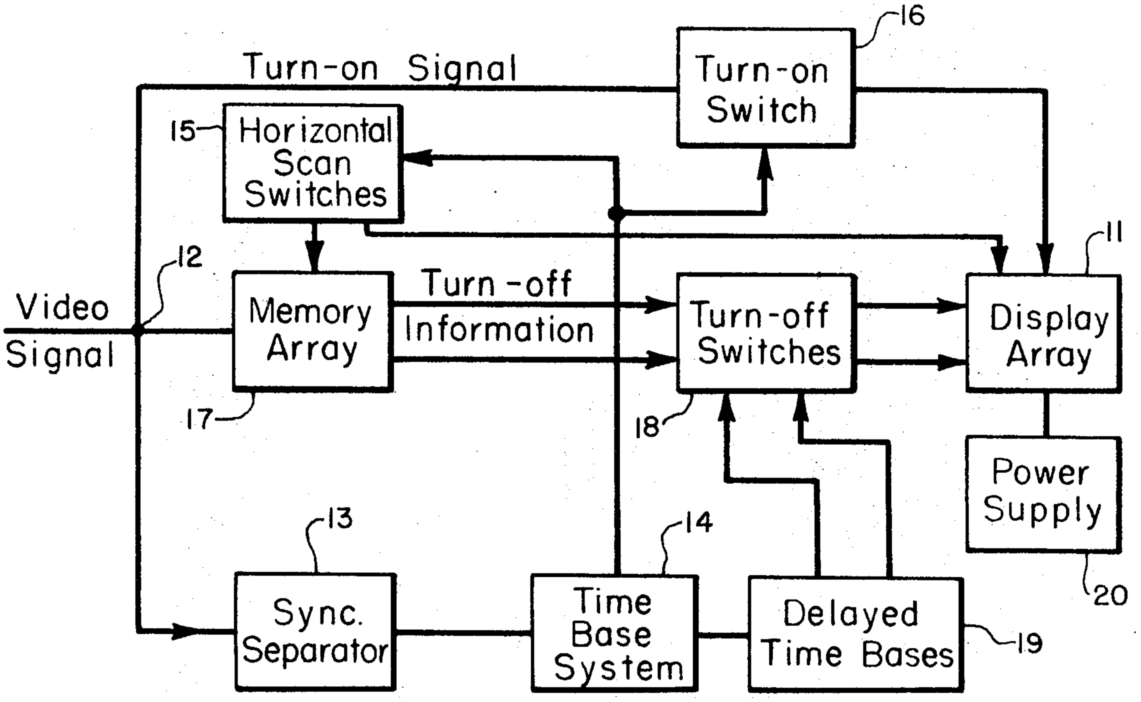
FIG. 1 is a schematic block diagram of a picture display system constructed in accordance with the present invention.

FIG. 1 shows a picture display system embodying the invention and comprising a solid-state image display panel composed of a matrix of display elements connected to a pair of crossed grids by which the display elements can be addressed systematically in a raster-scanning pattern. Image display device 11 may be of any of a number of different types of construction known in the art. For example, each of the display elements may comprise a switch connected to an injection diode which responds to an applied current to produce photons. Or image display device 11 may comprise a matrix of miniature gas cells each of which fires to produce a glow in response to an applied alternating voltage of a magnitude above a predetermined threshold. As a still further alternative, each of the display elements may be a shutter-type element which opens or closes in response to an applied voltage or current; such devices may be formed, for example, of nematic mesomorphic crystals or other known materials having such a behavior pattern, and display panels in which the display elements are of the shutter type may be operated in either a transmission or a reflection mode.

In prior devices and systems, the display elements (of whatever construction they may be) have normally been used not only to switch the light "ON" and "OFF," , but also to modulate the light intensity by varying the amplitude of the actuating voltage or current. In a picture display system embodying the invention, the display elements may be constructed and operated as simple binary elements, each having "ON" and "OFF" conditions, and the halftones are developed by controlling the times of actuation of the respective individual display elements, preferably in terms of different integral multiples of a line-scanning interval.

In the system of FIG. 1, video or picture signal information, which as will be seen may be either of an analog or a digital character depending upon the construction of the rest of the system, appears at an input terminal 12. The sync components are derived by a synchronizing signal separator 13 which applies the separated horizontal and vertical synchronizing signals to a suitable time base system 14 for generating horizontal and vertical scanning signals. The scanning signals from time base system 14 are employed to operate a bank 15 of horizontal scan switches which act as commutators to provide access to the display elements of display panel 11 and to the storage elements of a memory array 17 in a systematic raster-scanning sequence. Picture signal information from video signal source 12 is sequentially applied through a turn-on switch arrangement 16 and the horizontal scanning switches 15 to all display elements, so that all display elements in each horizontal line which are to be at any brightness level but maximum black are turned on. Simultaneously, the incoming video signal from source 12 is applied to memory array 17, which is separate from the image display device 11. The matrix-type memory array 17 is interrogated in a raster-scanning pattern which is synchronous with that employed for actuating image display panel 11, but delayed with respect thereto, by a turnoff switch arrangement 18 controlled by delayed time bases 19 which are actuated from the master time base system 14. The delay is only in the vertical scanning direction; in the horizontal direction the display and memory arrays are scanned synchronously. There are as many delayed time bases 19 as there are intermediate brightness levels in the time-modulated gray scale to be employed, and the time delays introduced by the respective delayed time bases 19 correspond to the numbers of line-scanning intervals of actuation of a display element required to produce the respective intermediate gray scale levels.

Thus, the display elements, except those which are instantaneously to be maintained at maximum black level, are sequentially turned on or actuated in a regular raster-scanning pattern determined by the synchronizing-signal components of the received video signal. At the same time, the video signal information is stored in a separate memory system which is interrogated to develop turnoff information for the image display panel which varies from one display element to another as a function of the brightness at the respective image points. If the display elements are not of the self-sustaining type, panel 11 is coupled to a power supply 20 which supplies a sustaining voltage or current for maintaining each actuated display element in the actuated state until a turnoff pulse is received.

The construction and operation of a preferred embodiment of the system generically represented by the schematic diagram of FIG. 1 is shown in FIGS. 2 through 5 inclusive.

For the sake of simplification in explanation, the system is shown as embodying only two intermediate brightness levels between maximum black and maximum white. In the illustrative system of FIGS. 2—5, maximum black level is represented by zero "ON" time, maximum white level by 16 scanning lines of "ON" time, and two intermediate brightness levels by four scanning lines and eight scanning lines of "ON" time respectively. It will of course be recognized that both the number of brightness levels and the relative spacings between them in terms of energization or "ON" time of the display elements may be selected as desired; to achieve image quality comparable to that obtained with conventional television receivers, the system is extended in an analogous manner to embody a larger number of intermediate brightness levels, preferably at least six, with or without square-law spacing between them.

Figure 2:
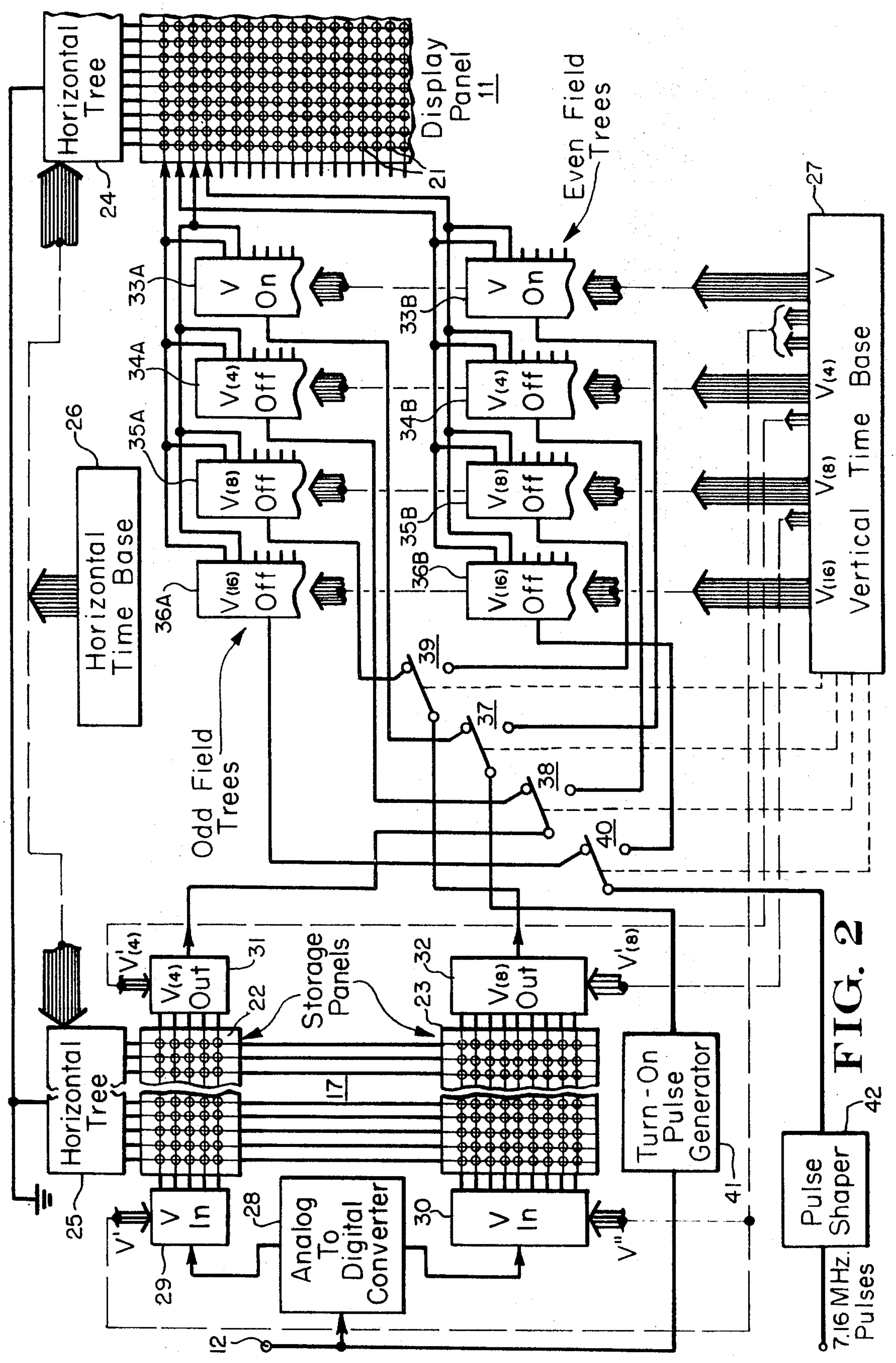

In FIG. 2, only a fragmentary portion of the image display panel is shown. For purposes of illustration and without any limitation on the type of display panel which may be employed, panel 11 may be of the type known as a plasma display panel, comprising individual miniature gas cells 21 located at the respective image points. Two grids of vertical and horizontal conductors respectively are provided to facilitate scanning access to the gas cells, 21 each vertical conductor being connected to one terminal of all gas cells in a given vertical column, while each horizontal conductor is connected to the opposite terminal of all gas cells disposed in a given horizontal row. The scanning conductors on the front side of the panel are transparent to permit direct viewing of the developed image. To permit the application of sustaining voltages, additional transparent conductive electrodes (not shown) are provided on opposite sides of the panel, each overlying the terminals of all gas cells and being separated therefrom by a thin insulating layer which functions as a coupling capacitor for applied AC sustaining voltages. The construction and operation of such a solid-state image display panel are well known, and are described for example, in a paper entitled "The Plasma Display Panel—A Digitally Addressable Display with Inherent Memory" presented by D. L. Bitzer and H. G. Slottow at the Fall Joint Computer Conference in Nov., 1966, and in other publications cited therein.

Memory array 17 constitutes separate panels 22 and 23 of binary storage elements such as capacitors, ferroelectric elements, magnetic storage elements or the like, one array being provided for each intermediate brightness level in the time-modulated gray scale to be employed. Array 22 is employed for processing of the brightness components requiring that picture control elements be energized for periods of four scanning lines in duration, and this array is therefore provided with five horizontal rows of individual storage elements each composed of a number of storage elements equal to the number of vertical columns of display elements 21 provided in the image display panel 11, the additional row being provided to permit picture signal storage in one row concurrently with picture signal readout in another. Storage array 23 is provided for processing the brightness level information requiring energization of the display elements for periods of eight scanning lines in duration, and accordingly is provided with nine horizontal rows of storage elements disposed in the same number of columns as the number of columns of display elements in display panel 11. Storage panels 22 and 23 are provided with horizontal and vertical rows and columns of electrical conductors to provide scanning access, as is well understood in the art.

Horizontal and vertical scanning of the storage elements of panels 22 and 23, and of the display elements 21 of image display panel 11, is achieved by the provision of appropriate switching systems for systematically commutating the respective rows and columns of scanning conductors so that the storage element in the case of panels 22 and 23, or the display element in the case of display panel 11, is interrogated or energized at the cross point between the respective horizontal and vertical conductors which are instantaneously effective by virtue of the commutating action of the switching systems. In FIG. 2, the switching systems take the form of switching trees each composed of a plurality of cascade-connected tiers of single-pole double-throw switches, the switches of each tier being operated at a different switching speed in a manner well known in the art. An illustrative four-tier switching tree is shown, for example, in FIG. 5. As is well known in the art, each of the switches may be constructed in the form of a transistor or a solid-state electronic switch for compactness, and to attain the high switching speeds required of some of the switches.

In FIG. 2, a horizontal tree 24 is provided for scanning or commutating between the vertical conductors of display panel 11, and a similar horizontal switching tree 25 is provided for switching between the vertical column conductors of the storage panels 22 and 23; in practice, depending on the impedance and voltage relationships, only a single such horizontal switching tree may be required, and the vertical column conductors of the storage panels may be connected in parallel with the corresponding vertical column conductors of display panel 11. Each of horizontal trees 24 and 25 comprises nine tiers of binary switches under the control of a corresponding number of output pulse trains generated by a horizontal time base 26 which is synchronized by the horizontal synchronizing components of the received television signal to be reproduced. The construction and operation of horizontal time base 26 and of the horizontal switching trees 24 and 25 will be described in greater detail in connection with FIGS. 4 and 5.

Vertical scanning or row commutation for both the display panel 11 and the storage panels 22 and 23 is controlled by a vertical time base 27 which is driven by the horizontal and synchronized by the vertical synchronizing components of the received composite television signal. The construction and operation of vertical time base 27 are considered more specifically in connection with FIG. 3.

In operation, a received composite video signal is applied to an analog-to-digital converter 28 which develops quantized video signals for application to storage panels 22 and 23 through respective input switching trees 29 and 30. Storage panels 22 and 23 are provided with respective output switching units 31 and 32 which include switching trees operated in frequency synchronism with input switching trees 29 and 30 respectively, but the switching operation of each output tree is time delayed relative to that of its associated input tree by an amount corresponding to the display element energization time associated with the brightness level served by the particular storage panel. Thus, storage panel 22 is provided with an output tree 31 operated at a delay of four scanning lines with respect to input switching tree 29, while the output switching tree 32 associated with storage panel 23 is delayed by eight scanning lines relative to its input switching tree 30. Output units 31 and 32 also include suitable pulse forming and shaping circuits for developing turnoff pulses of the proper waveform and polarity as determined by the type of display device employed.

Vertical time base 27 also operates two banks of input switching trees associated with display panel 11, designated "Odd Field Trees" and "Even Field Trees," respectively, and as these designations imply, the two banks of trees are provided to assure the development of a double-interlace scanning raster from a standard television signal. Each bank of input switching trees for display panel 11 comprises a number of individual vertical switching trees corresponding to the total number of discrete brightness levels in the time-modulated gray scale to be employed. Each of these switching trees includes eight tiers of switches and 252 output terminals, with provisions for resetting upon completion of each switching cycle. Corresponding output terminals of all switching trees in each bank are connected in parallel, and successive output terminals are connected to alternate horizontal row conductors of display panel 11. Each even field tree is operated synchronously with the corresponding odd field tree. Each of the vertical switching trees associated with display panel 11 is operated by a vertical time base, as indicated by the designation V, with the tiers of each tree actuated at different exponentially related speeds based on the vertical scanning frequency. Switching trees 34A and 34B, 35A and 35B, and 36A and 36B are of the same construction as trees 33A and 33B, but their actuation is delayed by the number of scanning lines corresponding to the desired display element energization times associated with the respective time-modulated gray scale brightness levels. The number of scanning lines delay in each instance is indicated by the numeral subscript associated with the letter V in the schematic showing of FIG. 2; for example, the $V_{(8)}$ outputs are synchronized with the V outputs, but are delayed 8 scanning lines with respect thereto. Vertical trees 34A and 34B, 35A and 35B, and 36A and 36B correspond to turnoff switches 18 in the simplified block diagram of FIG. 1.

Suitable turn-on and turnoff pulses are applied to the turn-on switching trees 33A and 33B and to the turnoff switching trees 34A and 34B, 35A and 35B, and 36A and 36B associated with display panel 11 through a series of single-pole double-throw access switches 37—40 which are synchronously actuated back and forth at the field-switching rate V by control pulses developed by vertical time base 27. One such access switch is provided for each of the brightness levels. Turn-on pulses are derived from the received video signal from input terminal 12 by a turn-on pulse generator 41 and are directly applied through access switch 37 to the turn-on switching trees 33A and 33B in alternation. These trees provide the required pulses to display panel 11 to turn on each display element which is to be at any brightness level other than maximum black. Output unit 31 from storage panel 22 is connected through access switch 38 to the input terminals of the $V_{(4)}$ turnoff trees 34A and 34B, and in the same manner output unit 32 from storage panel 23 is connected through access switch 39 to the input terminals of the $V_{(8)}$ turnoff trees 35A and 35B. Finally, 16-scanning-line-delayed turnoff pulses are generated by a pulse shaper 42, which is driven by a series of 7.16 MHz. pulses. The 7.16 megahertz trigger pulses may be derived from the local color subcarrier oscillator (3.58 megahertz) of a conventional color television receiver and synchronized to the horizontal scanning pulses. These $V_{(16)}$ turnoff pulses are applied through access switch 40 to the input terminals of the $V_{(16)}$ turnoff switching trees 36A and 36B in alternation.

In operation, the received video signal is effectively applied sequentially to all of the display elements 21 in display panel 11, through access switch 37 and turn-on trees 33A and 33B, with the return to ground or other appropriate reference voltage being provided through the horizontal switching tree 24. In this manner, all display elements except those representing maximum black level are turned "ON" at the time they are reached in the systematic raster-scanning pattern. Once turned "ON," each display element remains energized by application of the sustaining voltage from power supply 20 (FIG. 1) until a turnoff pulse is applied. Turnoff pulses are developed for image points of the first intermediate brightness level by output unit 31 associated with storage panel 22, and these are applied through access switch 38 to the $V_{(4)}$ turnoff trees 34A and 34B, so that the picture control elements 21 at the image points corresponding to the first intermediate brightness level are turned off with a delay of four scanning line intervals. Similarly, an eight scanning line delay in the turnoff pulses is achieved for the second intermediate brightness level by the use of storage panel 23 and its associated output unit 32, access switch 39, and the $V_{(8)}$ turnoff trees 35A and 35B.

One of the characteristics of the gas cells of the type used in the plasma display panel is that such a cell, once fired or lit, may be sustained in the energized condition by the application of an AC sustaining voltage of a magnitude less than the amplitude of the triggering voltage required to energize or fire the cell from a deenergized condition. Accordingly, application of an AC sustaining voltage without energizing any of the cells in the absence of an applied triggering impulse is entirely feasible, and this is accomplished by power supply 20 shown schematically in FIG. 1. The video-signal-derived pulses which are employed to turn on individual cells at selected image points are then effectively superimposed on the sustaining voltage to provide a resultant voltage sufficient to trigger the selected cells. Turnoff pulses, on the other hand, are phased to effectively subtract from the sustaining voltage to provide a resultant voltage below the minimum required to sustain energizations, with a waveform such that the cell will be extinguished at the end of the turnoff pulse.

Finally, display elements at the maximum brightness level are turned off after a delay of 16 scanning lines by delayed pulses $V_{(16)}$ developed by the pulse shaper 42 and applied through access switch 40 to the $V_{(16)}$ turnoff trees 36A and 36B.

Vertical time base 27 may be of any suitable construction for generating the respective sets of switching pulses for the various switching trees. A construction which is particularly well adapted to integrated circuit fabrication, and hence to physical integration with display panel 11, is shown in schematic form in FIG. 3.

Figures 3, 5:
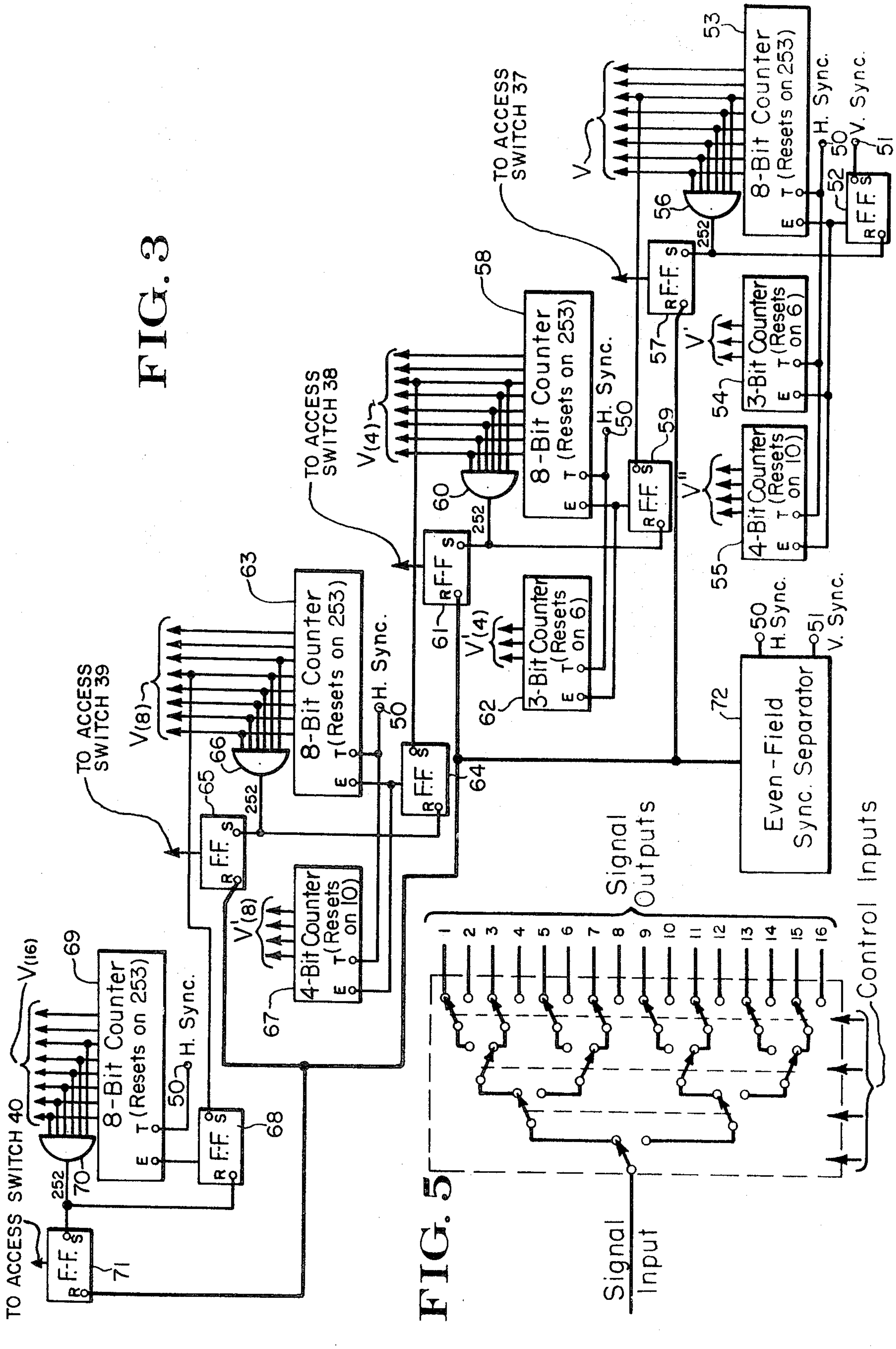

In FIG. 3, horizontal and vertical synchronizing signal pulses from sync separator 13 (FIG. 1) are applied to input terminals 50 and 51 respectively. Vertical sync pulses from input terminal 51 are applied to the "Set" input terminal S of a flip-flop 52 whose output circuit is connected to the "Enable" input terminals E of an eight-bit counter 53, a three-bit counter 54, and a four-bit counter 55. Horizontal sync pulses from input terminal 50 are applied to the "Trigger" input terminals T of counters 53, 54 and 55. Eight-bit counter 53 is of standard construction comprising a series of cascade-connected binary counter stages and is provided with a series of eight output leads coupled respectively to the successive counting stages. The outputs of the last six stages are connected to respective input terminals of an AND gate 56 to develop a reset pulse on the 252d count, which is the first count on which the last six successive binary stages are simultaneously placed in the same operating condition, and the reset pulse generated by AND gate 56 is employed to reset flip-flop 52 and to disable counters 53, 54 and 55 until the next succeeding field-synchronizing pulse is applied from vertical sync input 51. The output pulse generated by AND gate 56 is also employed to set a flip-flop 57 to generate a control pulse for access switch 37 in order to steer the turn-on pulses to the rows of display elements of the appropriate scanning field.

Three-bit counter 54 is internally connected to reset on a count of six and is employed to generate the V′ pulses for the vertical input tree 29 associated with storage panel 22. Similarly, four-bit counter 55 is connected to reset on a count of 10 and is employed to generate switching signals V″ for actuation of vertical input tree 30 associated with storage panel 23.

In a similar manner, eight-bit counter 58 counts horizontal synchronizing pulses from input terminal 50 to generate a series of switching signals for the $V_{(4)}$ turnoff trees 34A and 34B associated with display panel 11, but the setting pulse for flip-flop 59, which generates the enabling pulse for counter 58, is derived from an appropriate output lead from counter 53 to provide a four scanning line delay in the counting operations of counter 58 as compared with those of counter 53. AND gate 60 develops a reset pulse for application to the "Reset" terminal R of flip-flop 59 and also triggers a flip-flop 61 to develop a control pulse for access switch 38 in order to steer the $V_{(4)}$ turnoff pulses to the rows of display elements of the appropriate scanning field. A three-bit counter 62, connected to reset on a count of six, counts horizontal sync pulses from input terminal 50 to develop $V'_{(4)}$ switching signals for application to the $V_{(4)}$ output tree 31 associated with storage panel 22.

In similar fashion, an additional eight-bit counter 63 with associated flip-flop 64, flip-flop 65 and AND gate 66 are provided for generating the $V_{(8)}$ switching signals for application to the $V_{(8)}$ turn off trees 35A and 35B and access switch 39 associated with display panel 11, and a four-bit counter connected to reset on a count of ten, is enabled by the same flip-flop 64 to generate the $V'_{(8)}$ switching pulses for application to the $V_{(8)}$ output tree 32 associated with storage panel 23.

Finally, an eight-count output from eight-bit counter 63 is applied to the "Set" input terminal S of flip-flop 68 which develops an enabling pulse for an eight-bit counter 69 connected to count horizontal sync pulses from input terminal 50 to generate the $V_{(16)}$ actuating pulses for the $V_{(16)}$ turnoff trees 36A and 36B associated with display panel 11, and AND gate 60 and a flip-flop 71 being provided to generate a reset pulse for these trees, a control signal for access switch 40, and for resetting flip-flop 68.

An even field sync separator circuit 72 is used to generate reset pulses for flip-flops 57, 61, 65, and 71 to insure that these are all set to the same sign at the beginning of each even field, thus controlling access switches 37, 38 and 39 to have these all connected to the same field (except at the end of one field and the beginning of the next, when not all the access switches will be thrown the same way).

It will be appreciated that the foregoing arrangement provides for an interlace system in which scanning of each field starts in its upper left-hand corner. In contrast, the interlace system used in current commercial practice has alternate fields starting at the upper left-hand corner and the top center of the picture; if desired, circuitry to establish the conventional interlace scanning pattern can readily be devised using similar known techniques.

Figure 4:
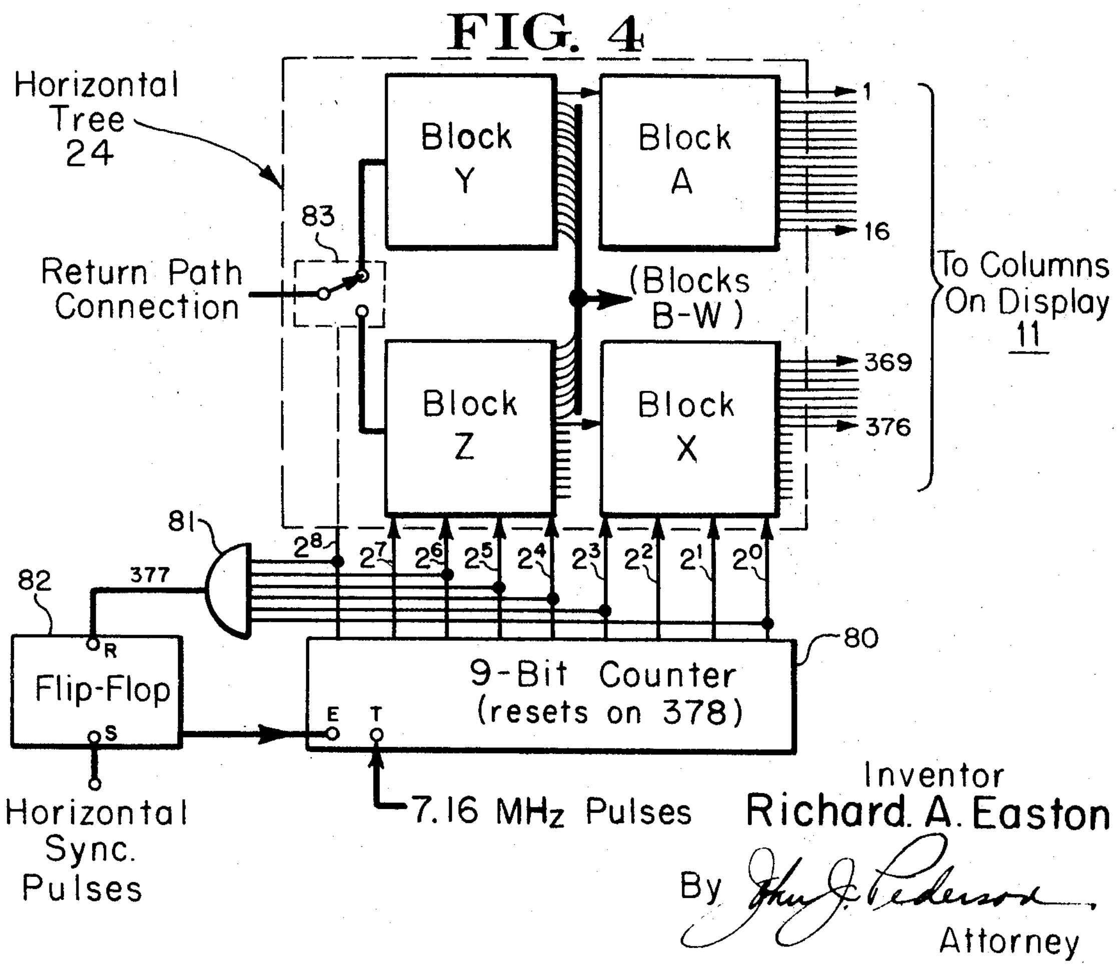
FIGS. 2, 3, 4 and 5 are more detailed schematic block diagrams of a preferred embodiment of the inventive system shown in FIG. 1.

Horizontal time base 26 is shown in greater detail in FIG. 4. The horizontal time base includes a nine-bit counter 80 which is synchronized by the horizontal sync pulses of the received television signal and triggered by the 7.16 megahertz pulses. Nine-bit counter 80 is wired to reset on the 378th count, and an AND gate 81 is coupled to selected output circuits of counter 80 to generate a gate pulse on the 377th count for application to the "Reset" terminal R of flip-flop 82. Horizontal sync pulses are applied to the "Set" terminal S of flip-flop 82. Flip-flop 82 generates an appropriately timed starting pulse for application to the "Enable" terminal E of nine-bit counter 80. The 7.16 megahertz pulses are applied to the "Trigger" terminal T of counter 80.

Horizontal tree 24 is composed of 26 standard four-tier switching trees, sequentially designated A through Z, each constructed as shown in FIG. 5, which are connected together in the manner illustrated in FIG. 4. Each standard tree block has 16 output terminals, and the output terminals of blocks A through X inclusive are connected sequentially to the column conductors of the display panel 11. Blocks Y and Z, in conjunction with a bistable return path connection switch 83, sequentially connect the input terminals of blocks A through X respectively to the ground return path.

Thus it will be seen that the switching rates required in the vertical scanning trees do not exceed the line-scanning frequency; at these switching rates, switching signal rise and decay times in the order of 10 microseconds are sufficient. For the horizontal scanning trees, the highest switching frequency is 7.16 megahertz; and switching signal rise and decay times in the range from 30 to 40 nanoseconds are required. These switching speeds and frequencies are readily attainable. For further detail on the construction of the counters, reference may be had to such standard text materials as Chapter 18 of the textbook "Pulse, Digital and Switching Waveforms" by Millman and Taub, published by McGraw-Hill Publishing Company.

In the embodiment of FIG. 2, as thus far described, separate memory matrices composed of binary storage elements are provided for each of the intermediate brightness levels in the time-modulated gray scale. With the use of such digital memory panels, the incoming video signal is of course required to be quantized before storage and this requires the provision of an analog-to-digital converter. Also, separate input and output switching trees are required for each of the several storage panels. It is also possible in accordance with the invention to provide a single-matrix memory panel for analog storage of the incoming video signal, in conjunction with provision for sequentially interrogating the memory panel at progressively higher storage levels to generate the differently delayed turnoff signals for each of the intermediate brightness levels. In such an embodiment, as shown in FIGS. 6 and 7, the need for an analog-to-digital converter (e.g., unit 28 in FIG. 2) is eliminated and the separate binary storage panels for the respective intermediate brightness levels are replaced by a single multiple-level matrix-type memory panel 101.

Figure 6:
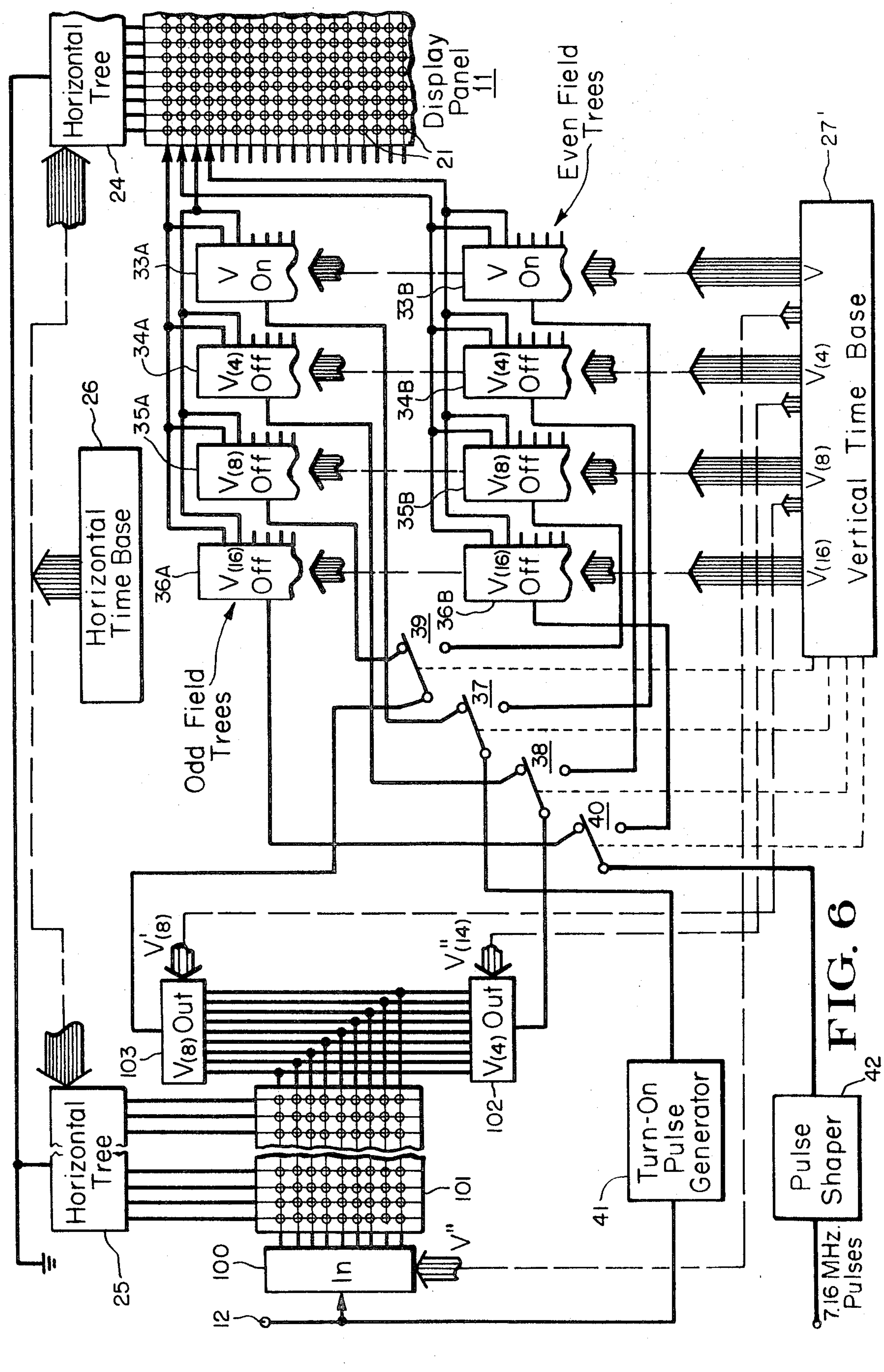
FIGS. 6 and 7, together with FIGS. 4 and 5, constitute a correspondingly detailed schematic showing of an alternate species of the system generically shown in FIG. 1.
Figure 7:
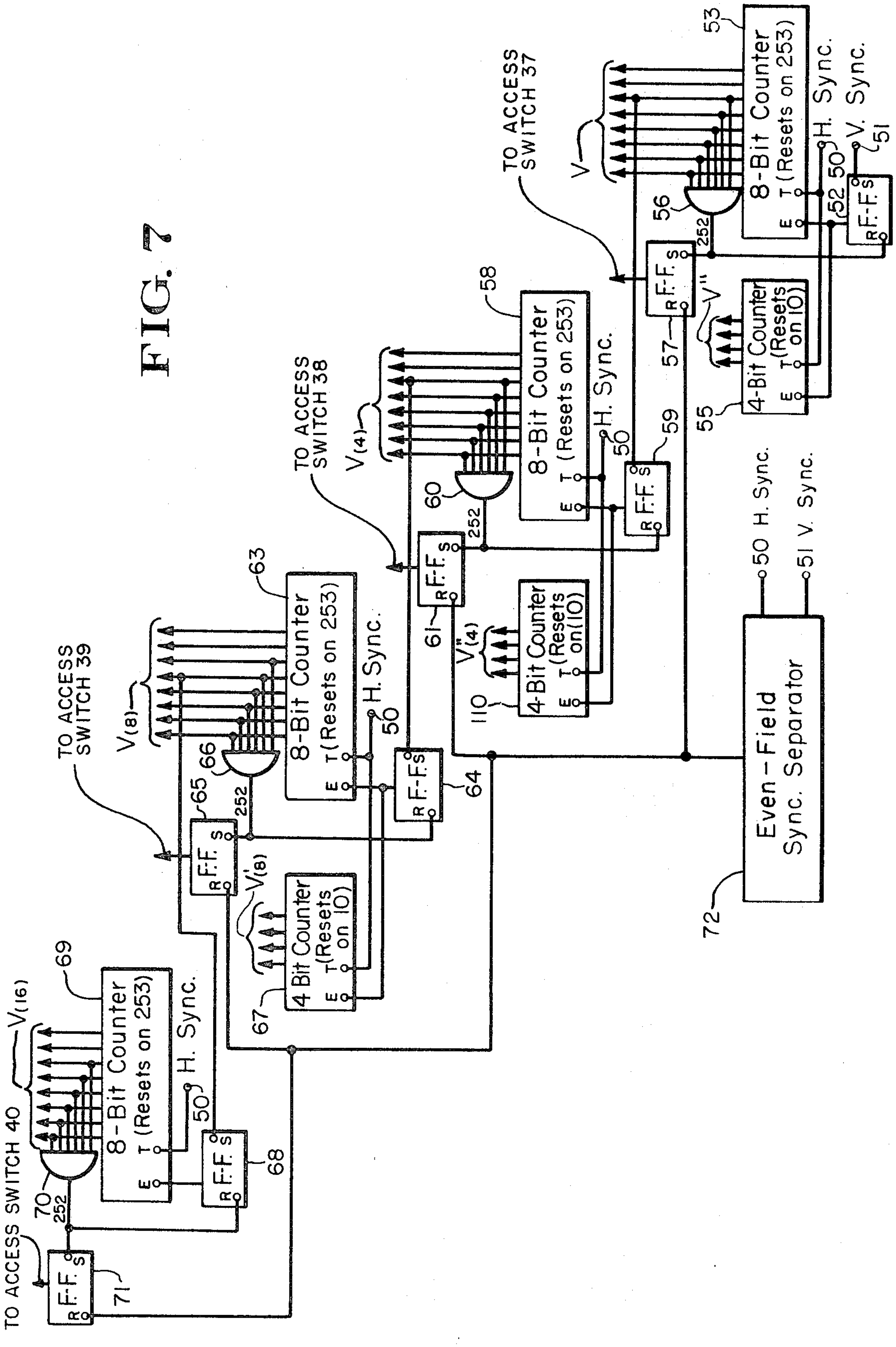

In FIG. 6, turn-on pulses developed by generator 41 from the incoming composite video signal are applied through field-controlled access switch 37 to the turn-on trees 33A and 33B associated with display panel 11, as in the FIG. 2 embodiment. As in the FIG. 2 embodiment, the turn-on pulses are suitably shaped so that all display elements which are to be at any level but black are turned on. However, in the FIG. 6 system, the composite video signal, still in analog form, is applied to an input tree 100 whose output conductors are connected to the row conductors of a matrix-type multiple-level memory panel 101, the column conductors of which are switched by horizontal tree 25 in the same manner as in the FIG. 2 embodiment. Separate output units 102 and 103, switched by the four-line-delayed and eight-line-delayed switching signals $V''_{(4)}$ and $V'_{(8)}$ respectively developed by vertical time base 27', are connected in parallel to the row conductors of storage panel 101. Units 102 and 103 include suitable pulse forming and shaping circuits to develop the required type of turnoff pulses, as well as respective switching trees for commutation. The output conductor of unit 102 extends through field-controlled access switch 38 to the $V_{(4)}$ turnoff switches 34A and 34B associated with display panel 11. Similarly, the output terminal of unit 103 is connected through field-controlled access switch 39 to the input terminals of the $V_{(8)}$ turnoff switches 35A and 35B associated with display panel 11. $V_{(16)}$ turnoff pulses are supplied by pulse shaper 42 as in the FIG. 2 embodiment.

In the system of FIG. 6, each storage element stores an amount of charge proportional to the video level of the picture element represented by the composite video signal at the moment of storage. The output units 102 and 103 are differently biased to interrogate the individual storage elements at different voltage levels, in a manner well known in the art, so that unit 103 is less sensitive than unit 102. Thus, when a storage element in the memory panel 101 is interrogated by the $V_{(4)}$ readout unit 102, if there is a charge stored there of magnitude greater than the threshold of the detector associated with the unit, no turnoff pulse is generated, while if the charge stored is less than this threshold, the tree generates a turnoff pulse which turns off the corresponding element of display panel 11, via access switch 38 and turnoff tree 34A or 34B. Similarly, when a storage element in panel 101 is interrogated by the $V_{(8)}$ readout unit 103, if its content is less than the threshold of the $V_{(8)}$ unit, a turnoff pulse is generated, while if its content is greater than this threshold, the corresponding element of the display panel is allowed to continue operating.

In order to get proper correlation between storage and readout levels, the video signal is applied to input tree 100 as a negative-polarity signal, i.e., with maximum voltage representing black level and minimum voltage white level. However, the video signal applied to the turn-on trees associated with display panel 11 must be applied as a suitably shaped positive-polarity signal, i.e., with black level at zero voltage and white signals positive going, so that all display elements which are not to be black are turned on by the superimposition of the turn-on pulses on the steady sustaining voltage impressed by power supply 19 (FIG. 1). This polarity inversion and pulse shaping is provided by turn-on pulse generator 41 between video signal source 12 and the turn-on trees 33A and 33B associated with display panel 11.

In the alternate embodiment of FIG. 6, vertical time base 27' is basically of the same construction as the vertical time base 27 of the FIG. 2 embodiment, except for those modifications necessitated by the specific changes in construction of the input and output units 100, 102 and 103 associated with storage panel 101. FIG. 7 shows the construction of modified vertical time base 27', and the system of FIG. 7 is identical in structure and operation to that of FIG. 3 with the exception of the omission of three-bit counter 54 and the conversion of three-bit counter 62 in FIG. 3 to a four-bit counter 110 in FIG. 7.

The embodiment of FIGS. 6 and 7 presents the advantage of somewhat greater structural simplicity than the embodiment of FIG. 2, inasmuch as the separate memory storage panel may be composed of a single matrix rather than providing separate matrices for each of the intermediate brightness levels. However, this advantage is achieved at the expense of requiring the provision of multilevel or analog type memory elements in the storage panel. In any event, all elements of the system in either embodiment are realizable with solid-state construction and are adapted to integrated circuit fabrication to constitute a compact package with the image display panel 11.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A picture display system for reproducing a halftone image represented by a picture signal comprising, in combination:

an image display device comprising a matrix of a predetermined number of individually actuatable display elements disposed at respective image points in a field pattern composed of a predetermined number of scanning lines, a memory device comprising a matrix of a number of storage elements smaller than said predetermined number of display elements, each storage element being associated with a plurality of display elements;

means including said storage elements and at least partially responsive to said picture signal for developing time-modulated control signal information comprising separate turn-on and turnoff pulses for said display elements with said turnoff pulses following said turn-on pulses by times corresponding to different integral numbers of said scanning lines in accordance with variations in the brightness level of said picture signal from image point to image point;

and means coupled to said last-mentioned means for actuating said display elements and for using said time-modulated control signal information to maintain each of said display elements individually actuated for a time corresponding to an integral number of said scanning lines and in proportion to the brightness level dictated by said picture signal for the associated image point.

2. A picture display system in accordance with claim 1, in which said display elements are of the on-off type and in which gray scale renditions are effected only by modulation of the on-time of the respective display elements.

3. A picture display system in accordance with claim 1, in which said display elements are separate light sources.

4. A picture display system according to claim 2, in which said memory device is an analog memory device comprising a matrix of storage elements each having a multilevel storage capacity, and in which said means for developing time-modulated control signal information comprises means for successively interrogating said memory device at different storage levels.

5. A picture display system according to claim 2, in which said memory device comprises a plurality of separate matrices of binary storage elements, each storage element of each of such matrices being associated with a plurality of said display elements, and in which said means for developing time-modulated control signal information comprises means for successively interrogating said separate matrices of storage elements.

6. A picture display system for reproducing an image represented by a picture signal, comprising:

an image display device comprising a matrix of display elements disposed at respective image points in a predetermined array;

a memory device comprising a separate matrix of storage elements respectively associated with said display elements;

means coupled to said memory device and responsive to said picture signal for storing in each of said storage elements information representing the instantaneous brightness level to be established by the associated display element of said image display device;

a first switching system coupled to said image display device for repetitively scanning said display elements in a rectangular coordinate scanning pattern comprising a predetermined number of scanning lines;

means including a second switching system for systematically reading said storage elements for stored brightness information;

and means coupling said second switching system to said first switching system for employing the brightness information read from said storage elements to energize each display element for a time corresponding to an integral number of said scanning lines, which number varies from display element to display element in proportion to the instantaneous brightness level to be established.

7. A picture display system according to claim 6, in which the numbers of line-scanning intervals associated with the respective brightness levels are related in accordance with a square-law distribution function or spacing function.

8. A picture display system for reproducing a halftone image represented by a picture signal comprising, in combination:

an image display device comprising a matrix of individually actuatable display elements disposed at respective image points in a field pattern composed of a predetermined number of scanning lines;

a memory device comprising a smaller matrix of storage elements each associated with a plurality of said display elements;

means responsive to said picture signal for sequentially storing brightness information in said storage elements and for synchronously actuating the display elements associated therewith;

means for reading said memory device to develop time-modulated control signal information comprising turnoff pulses which follow the actuation of said display elements by times corresponding to different integral numbers of said scanning lines in accordance with variations in the brightness level of said picture signal from image point to image point;

means coupled to said last-mentioned means for using said time-modulated control signal information to deactuate said display elements after each has been actuated for a time corresponding to an integral number of said scanning lines in proportion to the brightness level dictated by said picture signal for the associated image point.

9. A picture display system according to claim 8, in which said matrix of storage elements is physically separate and distinct from said matrix of display elements, and in which each of said storage elements has a multiple-level storage capacity.

10. A picture display system according to claim 8, in which said memory device comprises a plurality of matrices of binary storage elements, each storage element of each matrix being associated with a plurality of said display elements.